United States Patent [19]

Imazeki et al.

[11] 4,355,362
[45] Oct. 19, 1982

[54] TRACER CONTROL SYSTEM

[75] Inventors: Ryoji Imazeki; Etsuo Yamazaki, both of Hachioji, Japan

[73] Assignee: Fujitsu Fanuc Limited, Kawasaki, Japan

[21] Appl. No.: 130,598

[22] Filed: Mar. 17, 1980

[51] Int. Cl.³ ............................................. G05B 19/18
[52] U.S. Cl. ................................... 364/474; 318/571; 318/579; 364/520; 409/99
[58] Field of Search ....................... 364/474, 475, 520; 318/571, 578, 579, 162; 409/79, 98, 99, 127, 126, 130, 184, 210, 218, 69; 33/174 L, 174 P, 174 PC

[56] References Cited

U.S. PATENT DOCUMENTS

| | | | |
|---|---|---|---|
| 3,136,936 | 6/1964 | Eisengrein | 318/579 |
| 3,174,089 | 3/1965 | Hawkins et al. | 318/579 |
| 3,854,353 | 12/1974 | Cutler | 318/579 X |
| 4,025,764 | 5/1977 | Tack | 364/474 |
| 4,044,289 | 8/1977 | Wenzel et al. | 318/571 |
| 4,173,786 | 11/1978 | Kuhnell et al. | 364/475 |
| 4,224,670 | 9/1980 | Yamazaki | 318/578 X |

*Primary Examiner*—Joseph F. Ruggiero
*Attorney, Agent, or Firm*—Staas & Halsey

[57] ABSTRACT

In a system which performs tracer control by calculating the direction and the velocity of tracing through utilization of signals from a tracer head tracing the model surface, there are provided an input unit for entering data defining the tracing operation, a memory for storing the data and processor for reading out the data from the memory to control respective parts of a control device. Data concerning clamp tracing is read out by the processor to change the clamp level by a predetermined value for each working, thereby performing repetitive clamp tracing.

8 Claims, 4 Drawing Figures

TRACER CONTROL SYSTEM

BACKGROUND OF THE INVENTION

1. Field of the Invention

This invention relates to a tracer control system, and more particulary to a tracer control system which automatically changes the clamp level by a predetermined value for each working to perform clamp tracing continuously from rough to finish machining.

2. Description of the Prior Art

In clamp tracing according to a conventional tracer control system, for example, as shown in FIG. 1, a limit switch LS is provided at the position of a certain depth D of a model MDL where clamp tracing is desired to effect (which position will hereinafter be referred to as a clamp level); when the limit switch LS is turned ON by the movement of the tracer head, a feed in the direction of depth of the model MDL is stopped and a stylus is moved horizontally without contacting the model MDL; and tracing is re-started from the position where the stylus moves into contact with the model MDL. Upon completing of one machining operation, the position of the limit switch is changed, for example, by a predetermined depth of cut $\Delta D$ to a position LS', where the same clamp tracing as mentioned above takes place. By repeating such operation, the configuration of the model MDL is finally traced down to its bottom. Thus, since the conventional system calls for the limit switch, the reliability of the tracing operation is relatively low because of the mechanical operation of the limit switch, and since the position of the limit switch must be changed for each working operation, it is difficult to continue working operations from rough to finish machining without a break and the working time is long as a whole.

SUMMARY OF THE INVENTION

Accordingly, it is an object of the present invention to provide a tracer control system in which data on the clamp level is prestored in a memory and clamp feed points are controlled in accordance with the data to enable continuous tracing from rough to finish machining, thereby reducing the machining time.

Briefly stated, in the tracer control system of the present invention, there are provided an input unit for entering data defining the tracing operation, a memory for storing the data and a processor for reading out the data from the memory to control respective parts of a control device. The processor reads out from the memory data concerning clamp profiling and controls the clamp level to change by a predetermined value for each machining operation, thereby permitting repetitive tracing.

DESCRIPTION OF THE PREFERRED EMBODIMENTS

Figure 2:
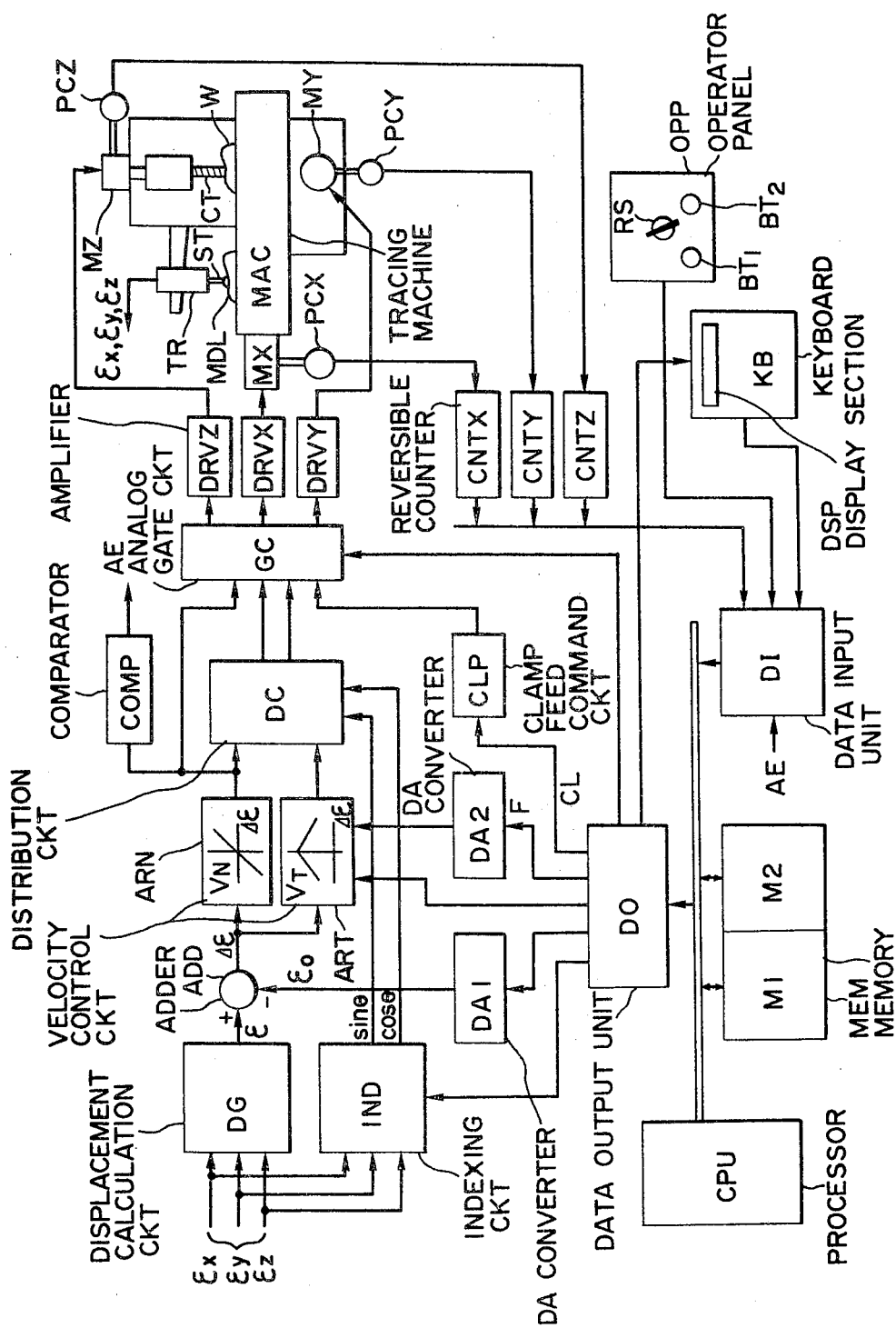
FIG. 2 is a block diagram illustrating an embodiment of the present invention.

FIG. 2 is a block diagram illustrating an embodiment of a tracer control system of the present invention. In FIG. 2, reference characters DG and IND respectively indicate a displacement calculation circuit and an indexing circuit which are supplied with displacement signals $\epsilon_x$, $\epsilon_y$ and $\epsilon_z$ from a trace head TR; ARN and ART designate velocity control circuits; ADD identifies an adder; DC denotes a distribution circuit; COMP represents a comparator; GC shows an analog gate circuit; DRVX, DRVY and DRVZ refer to amplifiers; MX, MY and MZ indicate servo motors; PCX, PCY and PCZ designate position detectors; MDL identifies a model; ST denotes a stylus; CT represents a cutter; W shows a work; MAC refers to a tracing machine; CNTX, CNTY and CNTZ indicate reversible counters which count pulses from the position detectors to indicate the current position of the stylus; CLP designates a clamp feed command circuit; OPP identifies an operator panel; RS denotes a setting dial for velocity or the like; BT1 and BT2 represent push buttons; KB shows a keyboard; DSP refers to a display; DI indicates a data input unit; MEM designates a memory composed of a data memory part M1 and a control program part M2; DO identifies a data output unit; CPU denotes a processor; DA1 and DA2 represent D-A converters; and MAN shows a manual operation control circuit.

The stylus ST held in contact with the surface of the model MDL is fed by the servo motors and the displacement calculation circuit DG derives a composite displacement signal $\epsilon = \sqrt{\epsilon_x^2 + \epsilon_y^2 + \epsilon_z^2}$ from displacement signals $\epsilon_x$, $\epsilon_y$ and $\epsilon_z$ corresponding to the displacement of the stylus ST, and the indexing circuit IND provides direction-of-displacement signals $\sin\theta$ and $\cos\theta$. The composite displacement signal $\epsilon$ is applied to the adder ADD to obtain a difference $\Delta\epsilon$ between the composite signal $\epsilon$ and a deflection signal $\epsilon_0$, which difference $\Delta\epsilon$ is provided to the velocity control circuits ARN and ART to obtain a normal-direction velocity signal $V_N$ and a tangential-direction velocity signal $V_T$. These signals $V_N$ and $V_T$ are applied to the distribution circuit DC to yield a velocity command signal in accordance with the direction-of-displacement signals $\sin\theta$ and $\cos\theta$, and the velocity command signal thus obtained is supplied to the analog gate circuit GC. The velocity command signal is then provided to that one of the amplifiers DRVX, DRVY and DRVZ which is selected by the analog gate circuit GC. By the velocity command signal, the servo motor corresponding to the selected amplifier is driven to feed the cutter CT and the tracer head TR in ganged relation to each other. Since the operations described above are already well-known in the art, no detailed description will be given.

In the present embodiment, tracing operation data including data on the clamp level is entered from the keyboard KB or the like for storage in the memory MEM, from which the data is read out as the tracing operation proceeds, and in accordance with the data, the tracing path including the clamp level is controlled. That is, the present embodiment permits continuous machining operations from rough to finish machining by automatically changing the clamp level for each machining operation in accordance with the stored data concerning the clamp level, without involving such a manual operation as is needed in the prior art. As the input data, use can be made of such, for example, as shown in the following table.

TABLE 1

| ITEM | SYMBOL | CODE |
| --- | --- | --- |
| Mode | (See Table 2) | A01 |
| Deflection | $\epsilon_0$ | A02 |
| Approach Axes | X, Y, Z | A03 |
| Direction of Approach | +, − | A04 |
| Velocity of Approach | $V_{AP}$ | F1 |
| Direction of Tracing | +, − | A05 |
| Velocity of Tracing | $V_{TF}$ | F2 |
| Direction of Pick Feed | +, − | |
| Velocity of Pick Feed | $V_{PF}$ | F3 |
| Quantity of Pick Feed | P | A06 |
| Tracing Turning Position | $L_P$ | X1 |
| Tracing Turning Position | $L_N$ | X2 |
| Tracing End Position | $L_{TE}$ | Y1 |
| Automatic Return | ON, OFF | A07 |
| Velocity of Automatic Return | $V_{AR}$ | F4 |
| Automatic Return Position | $L_{RP}$ | Z1 |
| Clamp Level Initial Position | $C_{PL}$ | C01 |
| Clamp Level Variation | $\Delta C_{PL}$ | C02 |
| Clamp Level Final Position | $C_{PLE}$ | C03 |

TABLE 2

| Mode | Sub-Mode |
| --- | --- |
| 1 Manual Tracing | |
| 2 Both-Ways Tracing | 45° Tracing |
| 3 One-Way Tracing | |
| 4 360 Deg. Tracing | Axial-Direction Pick |
| | Z-Axis Pick |
| 5 Partial Tracing | |
| 6 Three-Dimensional Tracing | |
| 7 Clamp tracing | |

Figure 1:
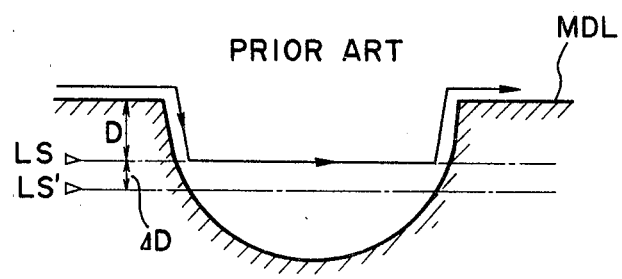
FIG. 1 is explanatory of conventional clamp profiling.
Figure 3:
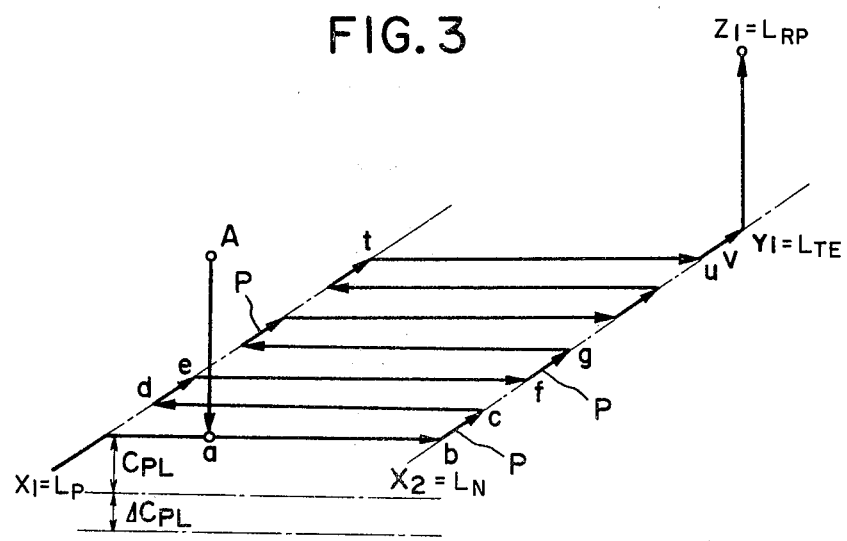
FIG. 3 is explanatory of an example of the tracing path.
Figure 4:
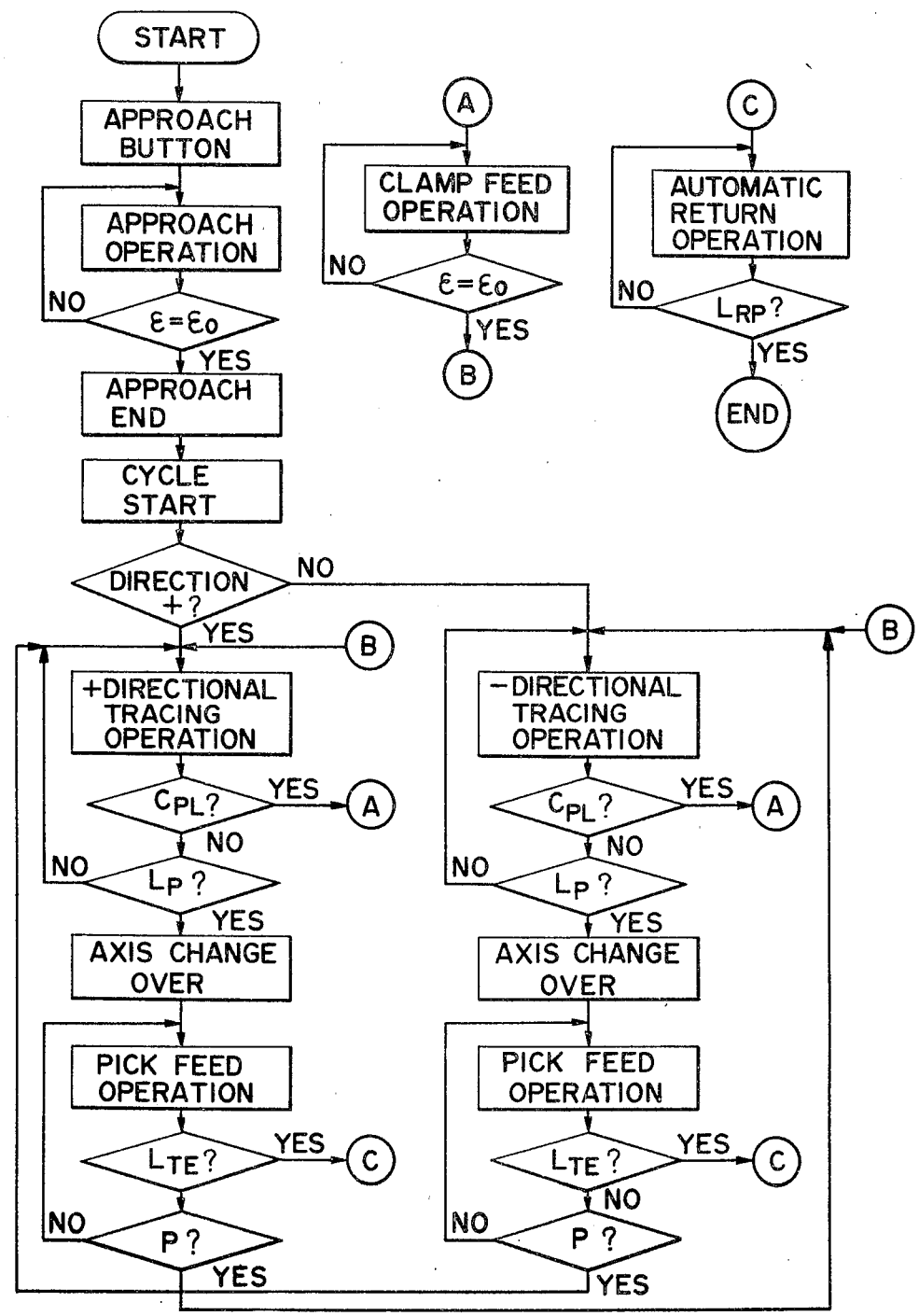
FIG. 4 is a flowchart explanatory of the operation of the embodiment shown in FIG. 2.

Turning now to FIG. 3, the tracer control by the present invention will be described. In FIG. 3, the tracing turning points $L_P$ and $L_N$ are X1 and X2; the pick feed P is AO2; the tracing end position $L_{TE}$ is Y1; the automatic return position $L_{RP}$ is Z1; and the clamp level initial position $C_{PL}$ is C01; and the stylus ST is controlled by the data on the velocity and direction of tracing so that it approaches a point a from a starting point A and traces the model surface following a route [a-b-c- . . . u-v] to effect clamp tracing in the sections a to b, c to d, . . . t to u and then automatically returns from the tracing end position Y1 to the automatic return position Z1. In this case, the tracing operation is controlled following such a flowchart as depicted in FIG. 4.

Upon depression of an approach button (not shown), the processor CPU reads out data on the axis, direction and velocity of approach from the memory MEM and provides a signal via the data output unit DO to the analog gate circuit GC to activate the amplifier DRVZ, causing the servo motor MZ to lower the tracer head TR and the cutter CT. The velocity in this case can be determined by data F supplied via the data output unit DO to the D-A converter DA2.

Before the stylus ST is brought into contact with the model MDL, the displacement signals $\epsilon_x$, $\epsilon_y$ and $\epsilon_z$ are zero, and accordingly the difference signal $\Delta\epsilon$ remains to be equal to the deflection signal $\epsilon_0$. When the composite displacement signal $\epsilon$ has become equal to the deflection signal $\epsilon_0$ as a result of contacting of the stylus ST with the model MDL, the comparator COMP detects that $\Delta\epsilon=0$, and applies an approach end signal AE to the data input unit DI. The approach end signal AE is read out by the processor CPU to detect the completion of approach, and then tracing is started.

Upon start of tracing, the processor CPU reads out data such as mode, the deflection, the direction and velocity of tracing, starting tracer control. The deflection data is converted by the D-A converter DA1 into an analog deflection signal $\epsilon_0$ for input to the adder ADD, and the servo motor MX is driven in a direction following the direction-of-tracing data. Further, the processor CPU reads out the clamp level initial position $C_{PL}$ from the memory MEM and compares it with the content of the reversible counter CNTZ representing the current position of the stylus ST.

When it is detected by the comparison that the content of the reversible counter CNTZ and the clamp level initial position $C_{PL}$ match with each other, the processor CPU sends out, by an interrupt operation, a start signal CL via the data output unit DO to the clamp feed command circuit CLP to start it and, at the same time, changes over the gate circuit GC to pass on a clamp feed command signal from the clamp feed command circuit CLP to a predetermined one of the servo motor. By this operation, the stylus ST does not trace but instead is moved in a horizontal direction, and clamp feed takes place at a predetermined level position.

During the clamp feed, since the displacement signals $\epsilon_x$, $\epsilon_y$ and $\epsilon_z$ of the stylus ST are zero, the difference signal $\Delta\epsilon$ remains equal to the deflection signal $\epsilon_0$, but when the stylus ST gets into contact with the model MDL, the composite displacement signal $\epsilon$ becomes equal to the deflection signal $\epsilon_0$, with the result that the difference signal $\Delta\epsilon$ becomes zero. When detecting that $\Delta\epsilon=0$, the comparator COMP applies the approach end signal AE to the data input unit DI, and the processor CPU reads out this approach end signal AE to detect that the stylus ST has been brought into contact with the model MDL by the clamp feed. Then, the processor CPU stops the clamp feed command circuit CLP via the data output unit DO and changes over the gate circuit GC to stop the clamp feed, restoring the aforesaid tracing operation.

Further, the processor CPU reads out the tracing turning position $L_P$ and $L_N$ from the memory MEM and compares them with the content of the counter CNTX. For example, in tracing of direction "−", when the content of the reversible counter CNTX and the tracing turning position $L_N$ match with each other, the axis is changed over the processor CPU reads out data such as the direction, velocity and quantity of pick feed P to control the pick feed. When the content of the reversible counter CNTY comes to be equal to the pick feed P from the start of the pick feed operation, the processor CPU causes the stylus ST to turn, that is, controls it to trace in the direction +. Further, the processor CPU checks whether the stylus ST has reached the tracing end position or not, and when detecting that the tracing end position $L_{TE}$ is reached during the pick feed, the processor CPU reads out the data of the automatic return, the automatic return velocity and the automatic return position $L_{RP}$ from the memory MEM. Since the automatic return is ON, the servo motor MZ is driven and when the content of the reversible counter CNTZ has come to indicate the automatic return position $L_{RP}$, one tracer control operation comes to an end.

In the event that repetitive tracing has been preset by the input from the keyboard KB, the processor CPU returns the stylus ST by known positioning control to the approach starting point A immediately following the automatic return operation, carrying out the clamp tracing again. In this case, the clamp level is $C_{PL}+\Delta C_{PL}$ which is the sum of the aforesaid clamp level position $C_{PL}$ and a clamp level variation $\Delta C_{PL}$ prestored in the memory MEM in consideration of the cutting performance of the tool used. Since the repetitive clamp tracing can be effected by automatically changing the clamp level for each working operation as described above, it is possible to achieve machining operations continuously from rough to finish machining, thereby markedly reducing the machining time.

The tracing turning positions $L_P$ and $L_N$, the tracing end position $L_{TE}$, the automatic return position $L_{RP}$, the pick feed P, the clamp level initial position $C_{PL}$, the clamp level variation $\Delta C_{PL}$ and the clamp level final position $C_{PLE}$ may also be obtained by setting in the memory MEM the contents of the reversible counters when the stylus ST is shifted to its respective positions in a manual feed mode, instead of entering the data from the keyboard KB.

Also during the tracing operation the tracing path including the clamp level can be corrected by reloading the data in the memory MEM. For example, the data in the memory MEM are read out therefrom and displayed on the display DSP and the data are corrected and reloaded by the manipulation of the keyboard KB. Thus, the clamp tracing start position, i.e. the clamp level initial position $C_{PL}$, the clamp level variation $\Delta C_{PL}$ and the clamp level final position $C_{PLE}$ can be corrected with ease.

In the foregoing embodiment, all data defining the tracing operation are prestored in a memory for controlling the tracing path including the clamp feed path, but in the present invention, all the data need not always be prestored; for example, the tracing turning position and the like may also be controlled by a limit switch as in the prior art.

As has been described above, the present invention permits repetitive clamp tracing by automatically changing the clamp level by a predetermined value for each working in accordance with prestored data on the clamp tracing and consequently machining operations can automatically be carried out continuously from rough to finish machine, resulting in the working time being greatly reduced.

It will be apparent that many modifications and variations may be effected without departing from the scope of the novel concepts of this invention.

What is claimed is:

1. A tracer control system which performs tracer control with variable clamp level by calculating the direction and velocity of tracing through utilization of displacement signals from a tracer head tracing a model surface, said displacement signals being utilized along with a predetermined composite displacement signal for generating normal and tangential velocity components with respect to said model surface for determining said direction and velocity of tracing, said system comprising:

an input unit for entering data defining a series of tracing operations, said data including clamp feed data for limiting the motion of said tracer head on a first predetermined axis of said tracer control system to a respective clamp level for each said tracing operation, and said data including data that is identical for each said tracing operation of said series of tracing operations, said identical data selectively including common starting and end points, and feed limits for the two axes of said tracer control system other than said first axis;

a memory for storing the data received from the input unit;

a processor for selectively reading out the data from the memory and from said data input unit and for controlling each said tracing operation in correspondence therewith;

means for detecting the current position of the tracer head according to each said tracer control system axis and for providing data corresponding to said current position to said input unit;

a control device including a clamp feed for controlling said clamp level of each said tracing operation according to said clamp feed data to a respective predetermined value for each said tracing operation, and means for switching between said tracing operation to said clamp feed and back to said tracing during each said tracing operation, depending on the value of said normal velocity component.

2. The system of claim 1, said clamp feed data comprising predetermined values for the initial and final clamp levels of said series of tracing operations.

3. The system of claim 1 or 2, said clamp feed data comprising an initial predetermined value for the clamp level of the first tracing operation and at least one respective predetermined incremental value by which the clamp level of each successive tracing operation is changed from the preceding tracing operation.

4. The system of claim 1 or 2, said clamp feed data comprising a respective predetermined value for each said tracing operation.

5. The system of claim 3, said data being stored in said memory in digital form, and said means for detecting the current position of the tracer head including, for each of said axes of said system, a reversible counter for counting pulses and a pulse generator connected to provide said pulses to said counter in correspondence to preselected increments of motion along each respective axis, the output of each said counter being provided to said data input unit for said selective access by said processor.

6. The system of claim 4, said data being stored in said memory in digital form, and said means for detecting the current position of the tracer head including, for each of said axes of said system, a reversible counter for counting pulses and a pulse generator connected to provide said pulses to said counter in correspondence to preselected increments of motion along each respective axis, the output of each said counter being provided to said data input unit for said selective access by said processor.

7. The system of claim 3, said first predetermined axis of each said clamp level corresponding to the z-axis of said system, said feed limits for said other axis being defined by a clamp feed for each said tracing operation, so that each said tracing operation involves a series of reciprocating motions along predetermined limits of the x-axis and a series of pick feeds along the y-axis, until a limit value along said y-axis included in said stored data is reached, for each said tracing operation of said series between said start and end points.

8. The system of claim 4, said first predetermined axis of each said clamp level corresponding to the z-axis of said system, said feed limits for said other axis being defined by a clamp feed for each said tracing operation, so that each said tracing operation involves a series of reciprocating motions along predetermined limits of the x-axis and a series of pick feeds along the y-axis, until a limit value along said y-axis included in said stored data is reached, for each said tracing operation of said series between said start and end points.

* * * * *